United States Patent
Peterson et al.

(10) Patent No.: US 9,738,008 B2
(45) Date of Patent: Aug. 22, 2017

(54) FLAIL ASSEMBLY WITH VANES

(71) Applicants: Arnold Neil Peterson, Eugene, OR (US); Jason Duke Tift, Cheshire, OR (US)

(72) Inventors: Arnold Neil Peterson, Eugene, OR (US); Jason Duke Tift, Cheshire, OR (US)

(73) Assignee: Astec Industries, Inc., Chattanooga, TN (US)

( * ) Notice: Subject to any disclaimer, the term of this patent is extended or adjusted under 35 U.S.C. 154(b) by 547 days.

(21) Appl. No.: 14/489,683

(22) Filed: Sep. 18, 2014

(65) Prior Publication Data
US 2015/0076265 A1 Mar. 19, 2015

Related U.S. Application Data

(60) Provisional application No. 61/879,732, filed on Sep. 19, 2013.

(51) Int. Cl.
*B27L 1/12* (2006.01)
*A01G 23/095* (2006.01)
*B27L 11/02* (2006.01)

(52) U.S. Cl.
CPC ............ *B27L 1/122* (2013.01); *A01G 23/095* (2013.01); *B27L 1/12* (2013.01); *B27L 11/02* (2013.01)

(58) Field of Classification Search
CPC .... B27L 1/00; B27L 1/12; B27L 1/122; B27L 1/125; B27L 1/127; B02C 2013/2816; B02C 2018/162
See application file for complete search history.

(56) References Cited

U.S. PATENT DOCUMENTS

| | | | |
|---|---|---|---|
| 4,640,325 A * | 2/1987 | Vaders | B27L 1/122 144/208.7 |
| 4,787,431 A | 11/1988 | Demlow | |
| 5,148,844 A | 9/1992 | Robison | |
| 5,293,916 A | 3/1994 | Kucherry, Sr. | |
| 5,322,104 A | 6/1994 | Morey et al. | |
| 5,349,999 A | 9/1994 | Peterson et al. | |
| 5,503,340 A * | 4/1996 | Doppstadt | B02C 13/09 241/189.1 |
| 2004/0118955 A1* | 6/2004 | Beaulieu | B02C 13/09 241/86.1 |

* cited by examiner

*Primary Examiner* — Matthew G Katcoff
(74) *Attorney, Agent, or Firm* — Chambliss, Bahner & Stophel, P.C.

(57) ABSTRACT

A flail assembly for use in debarking logs moving in a processing direction includes a debarking assembly having a shaft that is mounted for rotation above the logs moving in the processing direction. A flail having a fixed end is attached to the shaft. The flail has a length that defines an arc of rotation of the free end of the flail as the shaft is rotated. A housing is positioned adjacent the flail. The housing has a center line that is generally aligned with the processing direction, and a deflector vane which extends inwardly towards the arc of rotation of the free end of the flail. The deflector vane serves to direct bark chips that are cast upwardly by the flail away from the center line of the housing.

13 Claims, 4 Drawing Sheets

FLAIL ASSEMBLY WITH VANES

CROSS-REFERENCE TO RELATED APPLICATION

This application claims the benefit of U.S. Provisional Patent Application No. 61/879,732 which was filed on Sep. 19, 2013.

FIELD OF THE INVENTION

The present invention relates generally to devices for removing the bark and small limbs from logs, and more particularly, to a flail assembly that is adapted to remove bark and to direct the removed bark from the log being processed.

BACKGROUND OF THE INVENTION

The processing of logs into wood chips requires an apparatus to remove the bark and limbs from the logs and an apparatus to reduce the partially processed logs into chips. Bark is considered to be a contaminant in the chips, so it is desirable to completely remove all bark prior to the chipping process. Debarking assemblies frequently comprise two or more rotating shafts to which are attached multiple flails, and it is common for the debarking assembly to be combined with the log chipper. Logs are introduced into the space between the shafts of the debarking assembly in a direction normal to the axes of rotation of the shafts. Typically, the shafts are arranged so that at least one is an upper shaft and another is a lower shaft, although they may be laterally offset from each other. In such a device, the feed line along which the logs are passed through the machine is located between an upper shaft and a lower shaft. In order to remove the bark and limbs from the log, at least some of the flails on the upper shaft must reach down along the sides of the log to at least the mid-point. Similarly, at least some of the flails on the lower shaft must reach upwardly along the sides of the log to the mid-point. The length of the flails on each shaft is dictated by the size of the smallest log that is intended to be debarked.

Flails may be thirty-six inches long or longer, and are mounted close together. During the debarking operation, the flails will often produce a cloud of bark pieces, some of which will fall back and rest on the log. Even if the chipping machine is separated from the debarking assembly, loosened bark may remain on top of the log as it is transported into the chipping machine. Such bark pieces will then be carried through the chipper and become part of the chip product. It would be desirable if a debarking assembly could be provided that would prevent the contamination of the chip product with bark pieces.

ADVANTAGES OF THE INVENTION

Among the advantages of a preferred embodiment of the invention is that it provides a debarking assembly that minimizes the risk of contamination of the chip product with bark pieces. Other advantages and features of this invention will become apparent from an examination of the drawings and the ensuing description.

NOTES ON CONSTRUCTION

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

The use of any and all examples or exemplary language (e.g., "such as" and "preferably") herein is intended merely to better illuminate the invention and the preferred embodiment thereof, and not to place a limitation on the scope of the invention. Nothing in the specification should be construed as indicating any element as essential to the practice of the invention unless so stated with specificity.

Various terms are specifically defined herein. These terms are to be given their broadest possible construction consistent with such definitions, as follows:

The term "shaft", when used in reference to a debarking assembly, comprises a rotatable shaft, disc or drum to which one or more flails (as hereinafter defined) are attached.

The term "flail", when used as a noun, refers to a chain, cable or other elongate flexible device, one end of which is attached to a shaft that is rotated so that the free end, or a portion thereof, can come into contact with a log in a debarking assembly.

The terms "above", "upwardly" and similar terms, when used in reference to a relative direction on or with respect to a flail assembly, or a combination flail assembly and chipping machine, or a component or portion of such an assembly or machine, refer to a relative direction that is farther away from the surface on which the assembly or machine is placed in order to process logs.

The term "inwardly" and similar terms, when used in reference to a relative position or direction on or with respect to a housing for a debarking assembly, or a component or portion of such a housing, refer to a relative position or direction that is towards the interior of the housing.

The term "processing direction" refers to the direction of travel of a log for processing through a flail assembly or a combination flail assembly and chipping machine.

The term "center line", when used in reference to a housing for a debarking assembly, refers to a line on a plane that: (i) bisects the housing, and (ii) is perpendicular to the processing direction.

The term "front end" and similar terms refer to the end of a flail assembly or a combination flail assembly and chipping machine, or a component or portion of such an assembly or machine, which is nearest the point at which a log to be processed is introduced into the machine.

The terms "forward", "in front of", and similar terms, as used herein to describe a relative position or direction on or in connection with a flail assembly, a debarking assembly, or a combination flail assembly and chipping machine, or a component of such an assembly or machine, refer to a relative position or direction towards the front end of the assembly or machine.

The terms "back end", "rear end" and similar terms refer to the end of a flail assembly, a debarking assembly or a combination flail assembly and chipping machine, or a component or portion of such an assembly or machine, which is farther from the front end of the assembly, machine, component or portion thereof.

The terms "rearward", "behind", and similar terms, as used herein to describe a relative position or direction on or in connection with a flail assembly, a debarking assembly or a combination flail assembly and chipping machine or a component of such an assembly or machine, refer to a relative position or direction towards the rear end of the assembly or machine.

The term "upstream", when used in reference to a relative position or direction on or with respect to a housing for a debarking assembly, or a component or portion of such a housing, refers to a relative position or direction that is nearer the front end of the debarking assembly.

SUMMARY OF THE INVENTION

The invention comprises a flail assembly comprising a debarking assembly for use in debarking logs moving in a processing direction. This debarking assembly includes a shaft that is mounted for rotation above the logs moving in the processing direction, and a flail having a fixed end that is attached to the shaft and a free end. The flail has a length that defines an arc of rotation of the free end of the flail as the shaft is rotated. A housing is positioned adjacent the flail, which housing has a center line that is generally aligned with the processing direction. The housing also includes a deflector vane which extends inwardly towards the arc of rotation of the free end of the flail. This deflector vane has a configuration that serves to direct bark chips that are cast upwardly by the flail away from the center line of the housing.

In order to facilitate an understanding of the invention, the preferred embodiment of the invention, as well as the best mode known by the inventors for carrying out the invention, is illustrated in the drawings, and a detailed description thereof follows. It is not intended, however, that the invention be limited to the particular embodiment described or to use in connection with the apparatus illustrated herein. Therefore, the scope of the invention contemplated by the inventors includes all equivalents of the subject matter recited in the claims, as well as various modifications and alternative embodiments such as would ordinarily occur to one skilled in the art to which the invention relates. The inventors expect skilled artisans to employ such variations as seem to them appropriate, including the practice of the invention otherwise than as specifically described herein. In addition, any combination of the elements and components of the invention described herein in any possible variation is encompassed by the invention, unless otherwise indicated herein or clearly excluded by context.

DESCRIPTION OF THE PREFERRED EMBODIMENTS OF THE INVENTION

Figure 1:
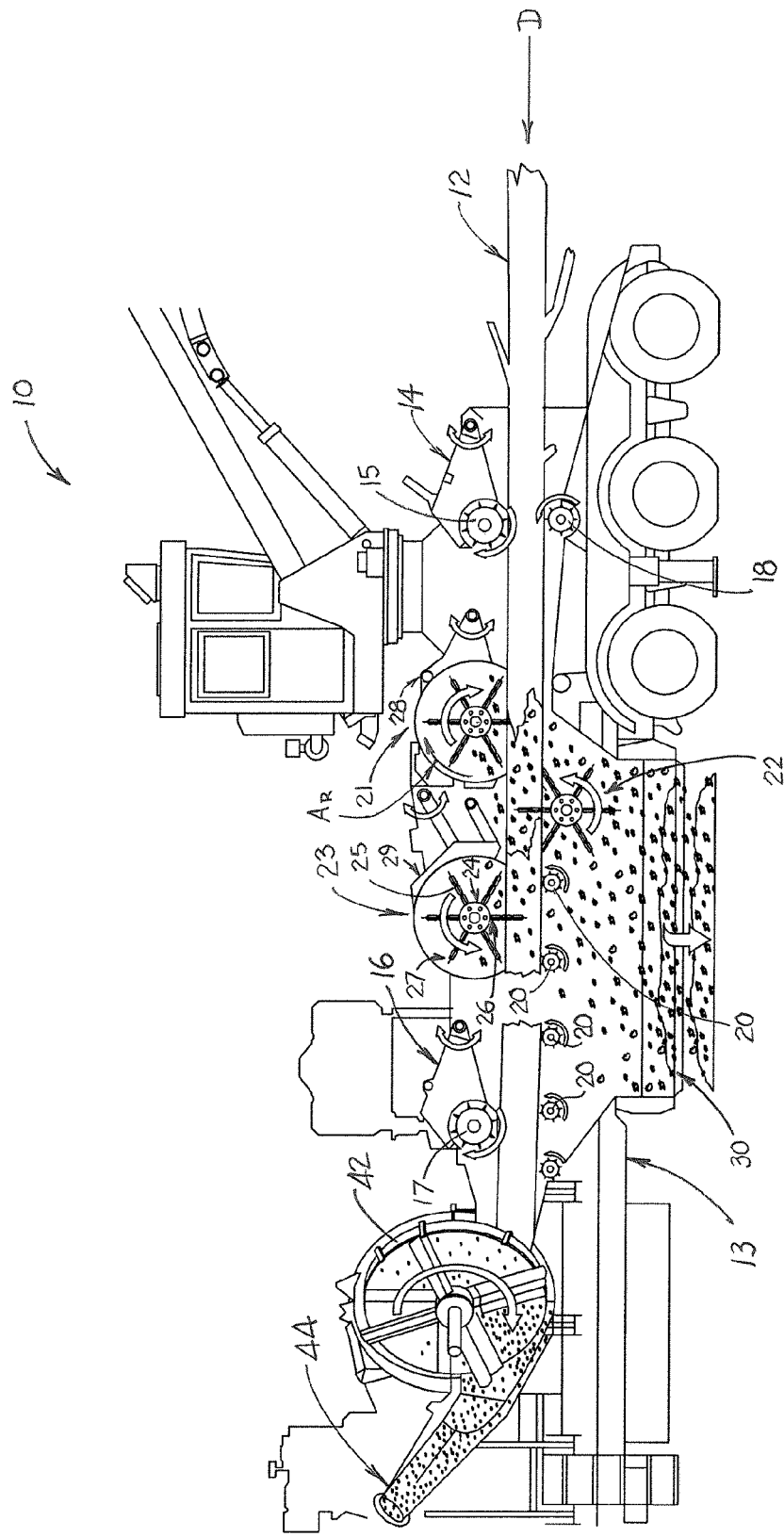
FIG. 1 is a side view, partially in section, of a combination flail assembly and log chipping machine that is equipped with the debarking assembly of the invention.
Figure 3:
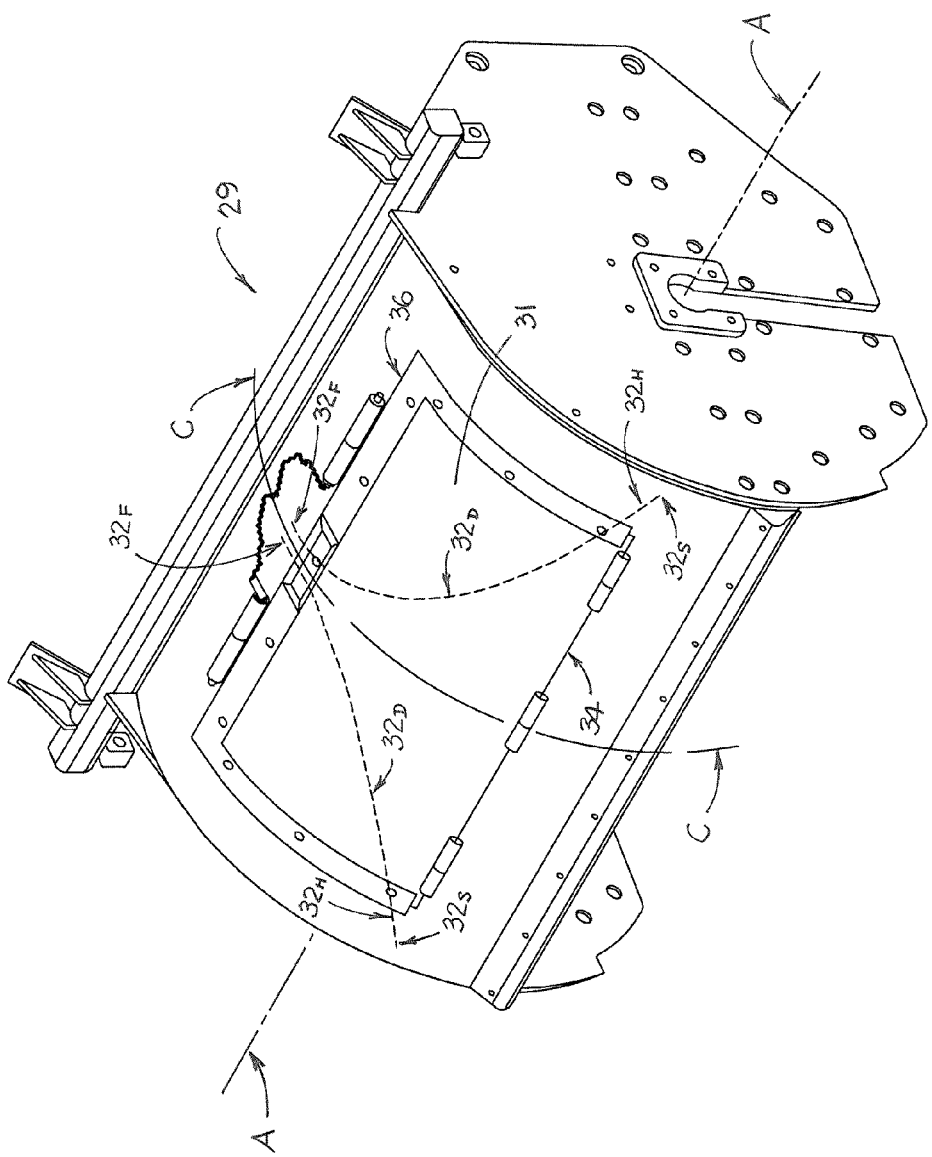
FIG. 3 is a perspective view of the debarking assembly housing of FIG. 2.

As shown in FIG. 1, log chipping machine 10 is a combination flail assembly and log chipping machine that is adapted to process a log such as log 12. The log is carried through the machine in processing direction D by contact with a plurality of rotating feed rolls. Upper feed roll assemblies 14 and 16 are pivotally mounted on the frame 13 of the machine above the log and are adapted to rotate feed rolls 15 and 17 respectively in a clockwise direction (as shown in FIG. 1). Lower feed rolls 18 and 20 are mounted below the log and are adapted to rotate in a counterclockwise direction (as shown in FIG. 1). Upper feed roll 15 and lower feed roll 18 cooperate to move log 12 into contact with debarking assemblies 21, 22 and 23. Each of the debarking assemblies includes a rotating shaft 24 to which are attached a plurality of flail chains 25. Each rotating shaft 24 rotates about an axis of rotation that is perpendicular to the plane of the page of FIG. 1. One such axis of rotation "A" is shown in FIG. 3. Each flail chain has a fixed end 26 that is attached to a shaft and a free end 27. Each flail chain is of a length that defines an arc of rotation $A_R$ of the free end 27 of the flail chain 25. Rotation of the shafts causes the chains to flail the bark from the log. As shown in FIG. 1, the shaft of first upper debarking assembly 21 rotates in a clockwise direction, while the shafts of lower debarking assembly 22 and second upper debarking assembly 23 rotate in a counterclockwise direction. Upper debarking assemblies 21 and 23 include housings 28 and 29 respectively that are pivotally mounted to the frame of machine 10. Much of the bark that is removed by the flail assembly falls into bark removal conveyor 30 for removal from the machine.

Figure 2:
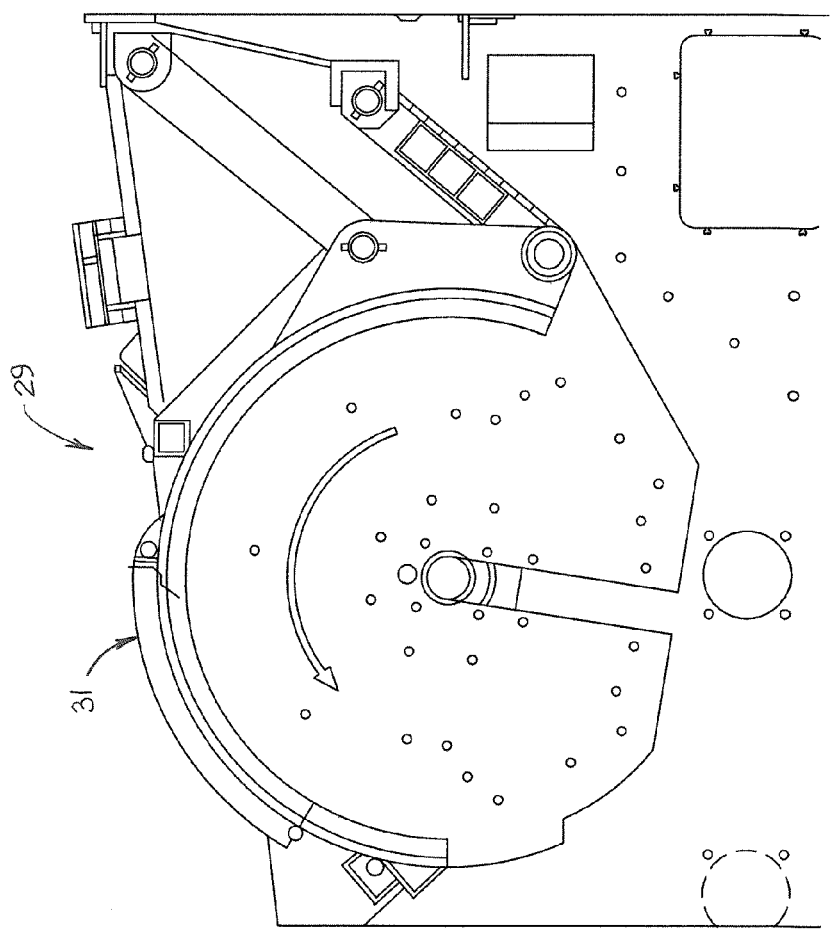
FIG. 2 is a side view of a debarking assembly housing that comprises a part of a preferred embodiment of the invention.
Figure 4:
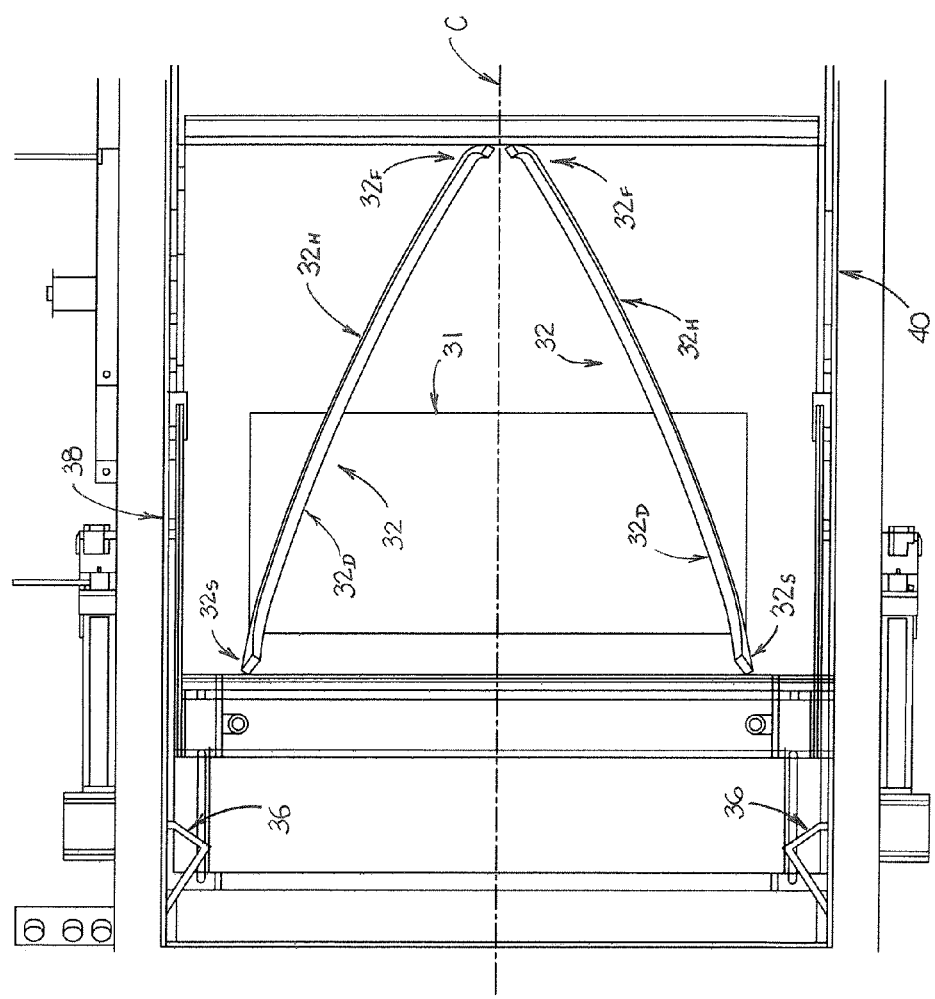
FIG. 4 is a view of the inside of the housing of FIGS. 2 and 3, showing the deflector vanes of a preferred embodiment of the invention.

Housing 29 of upper debarking assembly 23 is illustrated in FIGS. 2-4. Housing 29 has a center line C, and includes access door 31, on the inner surface of which are located deflector vanes 32 (shown in FIGS. 3 and 4). Preferably, two deflector vanes 32 are provided, which are curved and extend inwardly into the housing. More particularly, as shown in FIGS. 3 and 4, it is preferred that each of the deflector vanes has a first end $32_F$ and a second end $32_S$, said first end $32_F$ being located near the center line C of the housing. It is also preferred that each vane 32 is continuously curved so that its second end $32_S$ is located away from the center line C of the housing.

Various curvatures, orientations and arrangements of the deflector vanes are possible, so long as at least one vane serves to direct bark chips that are cast upwardly by the flail chains away from center line C of the housing. This will cause the bark chips to fall on one or both sides of the log (rather than on top) and onto bark removal conveyor 30. It is preferred that the outer extent of the arc described by the flail chains falls short of the deflector vanes, so that the deflector vanes are not contacted by the rotating flail chains. More particularly, in the preferred embodiment of the invention, the flail comprises a chain having a plurality of links, each of which has a chain-link length, and the inward extent of the deflector vane towards the arc of rotation $A_R$ of the free end 27 of the flail chain 25 is at least one/half of a chain-link length away from the arc of rotation of the free end of the flail.

The preferred deflector vanes 32 also include housing portions $32_H$ (comprising both first ends $32_F$ and second ends $32_S$) and door portions $32_D$ (shown in FIG. 3), so that when access door 31 is closed, deflector vanes 32 extend without interruption across the hinged side 34 of the housing and the door-opening side 36 of the housing, and so that access door 31 may still be opened.

As shown in FIG. 4, a pair of log alignment projections 36 are located on the insides of sidewalls 38 and 40 of housing 29 upstream from deflector vanes 32. Projections 40 help to guide the log being processed away from the sidewalls of housing 29 and serve to allow space between the log being processed and the sidewalls of the housing for bark to fall onto bark removal conveyor 30.

Referring again to FIG. 1, upper feed roll 17 helps to advance the flailed log into chipper disk 42, which rotates in a clockwise direction (as shown in FIG. 1) to reduce the log to chips that pass out of the machine through chute 44.

The invention provides a debarking assembly that includes at least one deflector vane that serves to direct bark chips off of the top of the log being processed.

Although this description contains many specifics, these should not be construed as limiting the scope of the invention but as merely providing illustrations of the presently preferred embodiments thereof, as well as the best mode contemplated by the inventors of carrying out the invention. The invention, as described herein, is susceptible to various modifications and adaptations, as would be understood by those having ordinary skill in the art to which the invention relates, and the same are intended to be comprehended within the meaning and range of equivalents of the appended claims.

What is claimed is:

1. A flail assembly comprising a debarking assembly for use in debarking logs moving in a processing direction, which debarking assembly includes:
    (a) a shaft that is mounted for rotation above the logs moving in the processing direction, said shaft having an axis of rotation that is perpendicular to the processing direction;
    (b) a flail having a fixed end that is attached to the shaft and a free end, said flail having a length that defines an arc of rotation of the free end of the flail as the shaft is rotated;
    (c) a housing that is positioned adjacent the flail, said housing having:
        (i) a center line that is generally aligned with the processing direction and is perpendicular to the axis of rotation of the shaft;
        (ii) a deflector vane which extends inwardly towards the arc of rotation of the free end of the flail, said vane having a configuration that serves to direct bark chips that are cast upwardly by the flail away from the center line of the housing.

2. The flail assembly of claim 1 wherein:
    (a) the flail comprises a chain having a plurality of links, each of which has a chain-link length;
    (b) the inward extent of the deflector vane is at least one/half of a chain-link length away from the arc of rotation of the free end of the flail.

3. The flail assembly of claim 1 wherein the housing includes a pair of deflector vanes, each of which extends inwardly into the housing.

4. The flail assembly of claim 3 wherein each of the deflector vanes:
    (a) has a first end and a second end, said first end being located near the center line of the housing;
    (b) is continuously curved so that its second end is located away from the center line of the housing.

5. The flail assembly of claim 3 wherein:
    (a) the housing has a hinged side and a door opening side;
    (b) the housing includes an access door that is hinged on the hinged side of the housing and adapted to open from the door opening side to provide access to the debarker assembly;
    (c) each of the deflector vanes includes a housing portion and a door portion, so that:
        (i) when the access door is closed, the deflector vanes extend without interruption across the hinged side of the housing and the door-opening side of the housing;
        (ii) the access door may still be opened.

6. The flail assembly of claim 3 wherein the housing comprises:
    (a) a pair of sidewalls;
    (b) a log alignment projection on each sidewall upstream from the pair of deflector vanes.

7. A combination flail assembly and chipping machine comprising:
    (a) a frame;
    (b) a plurality of feed rolls that are mounted for rotation on the frame so as to carry a log through the machine in a log processing direction;
    (c) a flail assembly comprising at least one upper debarking assembly and at least one lower debarking assembly, wherein each debarking assembly includes:
        (i) a shaft that is mounted for rotation adjacent to the logs moving in the processing direction, said shaft having an axis of rotation that is perpendicular to the processing direction;
        (ii) a flail having a fixed end that is attached to the shaft and a free end, said flail having a length that defines an arc of rotation of the free end of the flail as the shaft is rotated;
    (d) a housing that is positioned adjacent the flail of the upper debarking assembly, said housing having:
        (i) a center line that is generally aligned with the processing direction and is perpendicular to the axis of rotation of the shaft;
        (ii) a deflector vane which extends inwardly towards the arc of rotation of the free end of the flail, said vane having a configuration that serves to direct bark chips that are cast upwardly by the flail away from the center line of the housing;
    (e) a chipper disk which is adapted to reduce the flailed log to chips.

8. The combination flail assembly and chipping machine of claim 7:
    (a) which includes a flail assembly comprising a first upper debarking assembly, a second upper debarking assembly that is spaced from the first upper debarking assembly, and a lower debarking assembly, wherein each debarking assembly includes:
        (i) a shaft that is mounted for rotation with respect to the log moving in the processing direction;
        (ii) a plurality of flails, each having a fixed end that is attached to the shaft and a free end, wherein each said flail has a length that defines an arc of rotation of the free end of the flail as the shaft is rotated;
    (b) a housing that is positioned adjacent the plurality of flails of each of the upper debarking assemblies, each of said housings having:
        (i) a center line that is generally aligned with the processing direction;
        (ii) a deflector vane which extends inwardly towards the arc of rotation of the free ends of the flails, said vane having a configuration that serves to direct bark chips that are cast upwardly by the flails away from the center line of the housing.

9. The combination flail assembly and chipping machine of claim 7 wherein:
    (a) the flail of the upper debarking assembly comprises a chain having a plurality of links, each of which has a chain-link length;

(b) the inward extent of the deflector vane is at least one/half of a chain-link length away from the arc of rotation of the free end of the flail.

10. The combination flail assembly and chipping machine of claim 7 wherein the housing that is positioned adjacent the flail of the upper debarking assembly includes a pair of deflector vanes, each of which extends inwardly into the housing.

11. The combination flail assembly and chipping machine of claim 10 wherein each of the deflector vanes:
   (a) has a first end and a second end, said first end being located near the center line of the housing;
   (b) is continuously curved so that its second end is located away from the center line of the housing.

12. The combination flail assembly and chipping machine of claim 10 wherein the housing comprises:
   (a) a pair of sidewalls;
   (b) a log alignment projection on each sidewall upstream from the pair of deflector vanes.

13. The combination flail assembly and chipping machine of claim 10 wherein:
   (a) the housing has a hinged side and a door opening side;
   (b) the housing includes an access door that is hinged on the hinged side of the housing and adapted to open from the door opening side to provide access to the debarking assembly;
   (c) each of the deflector vanes includes a housing portion and a door portion, so that:
      (i) when the access door is closed, the deflector vanes extend without interruption across the hinged side of the housing and the door-opening side of the housing;
      (ii) the access door may still be opened.

* * * * *